(12) United States Patent
Hutchinson

(10) Patent No.: US 12,487,151 B2
(45) Date of Patent: Dec. 2, 2025

(54) WHOLE VEHICLE FAULT DETECTION USING CENTRALLY LOCATED GAS ANALYSIS

(71) Applicant: TORC Robotics, Inc., Blacksburg, VA (US)

(72) Inventor: John Hutchinson, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 315 days.

(21) Appl. No.: 18/193,939

(22) Filed: Mar. 31, 2023

(65) Prior Publication Data

US 2024/0280445 A1  Aug. 22, 2024

Related U.S. Application Data

(60) Provisional application No. 63/446,716, filed on Feb. 17, 2023.

(51) Int. Cl.
*G01N 1/24* (2006.01)
*F02D 41/14* (2006.01)
(Continued)

(52) U.S. Cl.
CPC ........... *G01N 1/24* (2013.01); *F02D 41/1495* (2013.01); *G01N 21/3504* (2013.01);
(Continued)

(58) Field of Classification Search
CPC .. G01N 1/24; G01N 33/0006; G01N 27/4175; G01N 33/007; G01N 21/3504; G07C 5/0808; F02D 41/1495
(Continued)

(56) References Cited

U.S. PATENT DOCUMENTS 5,731,510 A * 3/1998 Jones ................. G01N 33/0031
73/23.31
6,148,656 A * 11/2000 Breton .................. F01N 13/008
73/23.31
(Continued)

FOREIGN PATENT DOCUMENTS

CN  101311709 B  *  3/2014
CN  110228431 B  *  1/2025  ............ B60R 16/02
(Continued)

*Primary Examiner* — Stephanie E Bloss
*Assistant Examiner* — Kevin C Butler
(74) *Attorney, Agent, or Firm* — Armstrong Teasdale LLP

(57) ABSTRACT

Embodiments described herein include a system of fluid-delivery hardware, including tubes, valves, and pumps that deliver samples of fluid gathered from various exposed locations of a vehicle to commonly located gas analysis sensors. A durable sensor housing contains the gas sensors and is situated in a confined location of the vehicle, which is environmentally isolated and physically partitioned from the sample locations exposed to potentially deleterious environments. For a given sample location, a tube and valves gather and channel fluid samples from the sample location towards the sensor housing at the confined location. A pump forces air outwards to purge debris in the tube or tube inlet, and draws air inward through the tube towards the sensor housing for delivery to the sensors.

17 Claims, 5 Drawing Sheets

(51) Int. Cl.
*G01N 21/3504* (2014.01)
*G01N 27/417* (2006.01)
*G01N 33/00* (2006.01)
*G07C 5/08* (2006.01)

(52) U.S. Cl.
CPC ..... *G01N 27/4175* (2013.01); *G01N 33/0006* (2013.01); *G01N 33/007* (2013.01); *G07C 5/0808* (2013.01)

(58) Field of Classification Search
USPC .......................................................... 73/1.06
See application file for complete search history.

(56) References Cited

U.S. PATENT DOCUMENTS

| | | | | |
|---|---|---|---|---|
| 8,594,933 B2* | 11/2013 | Neugebauer | ........... | G07C 5/008 701/484 |
| 11,635,312 B2* | 4/2023 | Fox | ...... | G01D 18/002 73/31.05 |
| 11,788,999 B2* | 10/2023 | Wei | ........ | G01D 21/00 73/40.5 R |
| 11,802,633 B2* | 10/2023 | Wayman | ................. | E03B 7/075 |
| 2008/0011057 A1* | 1/2008 | Spaolonzi | ............... | G01M 3/38 73/40 |
| 2008/0168826 A1* | 7/2008 | Saidi | ....... | G01M 3/20 73/40 |
| 2015/0371465 A1* | 12/2015 | Garrett | .................. | G06F 16/335 701/29.1 |
| 2021/0221390 A1* | 7/2021 | Slobodyanyuk | .......... | G01S 7/40 |
| 2022/0003581 A1* | 1/2022 | Fox | ........ | G01D 3/022 |
| 2022/0128414 A1* | 4/2022 | Goossens | ................. | G01K 7/24 |
| 2022/0198921 A1* | 6/2022 | Kangasrääsiö | ..... | G08G 1/0116 |
| 2023/0149608 A1* | 5/2023 | Ponomarev | ......... | A61M 1/1607 210/646 |
| 2024/0119767 A1* | 4/2024 | Shetty | ..................... | G01M 3/24 |
| 2024/0280445 A1* | 8/2024 | Hutchinson | .............. | G01N 1/24 |

FOREIGN PATENT DOCUMENTS

| | | | | |
|---|---|---|---|---|
| DE | 19605053 A1 * | 9/1996 | ......... | F02D 41/1453 |
| DE | 10230763 A1 * | 1/2004 | ........... | F01N 13/008 |
| DE | 102021102475 A1 * | 8/2022 | | |
| DE | 102023111437 A1 * | 11/2024 | | |
| JP | 6989654 B2 * | 1/2022 | | |

* cited by examiner

WHOLE VEHICLE FAULT DETECTION USING CENTRALLY LOCATED GAS ANALYSIS

CROSS-REFERENCE TO RELATED APPLICATIONS

This application claims priority to U.S. Provisional Patent Application Ser. No. 63/446,716, filed Feb. 17, 2023, which is incorporated by reference in its entirety.

TECHNICAL FIELD

This application generally relates to monitoring and managing an automated vehicle. In particular, the application relates to managing sensor instrumentalities to accommodate improved sensor performance and improved vehicle diagnostics.

BACKGROUND

Many vehicle problems or failures, such as burning oil, overheating fluids, fuel leaks, and exhaust leaks, are typically detected by a driver's human senses (e.g., smell, hearing). As automated vehicles improve, drivers are becoming less necessary to operate the vehicle. As such, automated vehicles need to be less dependent upon drivers for detecting problems. It would be beneficial for automated vehicles to include a means of replicating human senses.

Vehicle problems often produce environmental physical effects, such as particulates, smoke, or other compounds, typically detected by the driver's senses. Various types of gas analysis sensors could readily detect these environmental effects in the absence of the human driver. Unfortunately, many of these sensors are expensive or not robust enough to be situated in an automotive environment, such as placement near a wheel bearing or inside an engine bay. This limits the use cases of these sensors.

SUMMARY

What is needed is a means of deploying gas analysis sensors (sometimes referred to herein as "gas sensors" or "fluid sensors") in automated (e.g., autonomous) vehicles in manner that protects the gas sensors from deleterious effects of the automotive environment and does not compromise the gas sensors' effectiveness.

Embodiments described herein address the shortcomings in the art described above, and may provide any number of additional or alternative benefits as well. A protective shell or housing contains a set of gas sensors, and the housing is situated in a protected or confined location of the automated vehicle (e.g., cab). The confined location is environmentally isolated and physically partitioned from exposure locations of (within or around) the automated vehicle having potentially damaging environments, where the gas sensors would not be exposed to damaging environmental effects (e.g., moisture, excess temperature) of the exposure locations. In this way, vehicles, and particularly automated vehicles employ and benefit from gas analysis sensors' capabilities of detecting faults in the vehicle without human involvement.

Described herein are systems and methods for improved sensor data collection and fault detection. Embodiments include a system of fluid delivery hardware, including tubes, valves, pumps, to deliver samples of fluid (e.g., gas, air, liquids) gathered from various exposed locations (sometimes referred to "sample locations") of the vehicle to commonly located sensors. The sensors are in a housing situated in a confined location of the vehicle. Non-limiting examples of the gas sensors include Volatile Organic Compound (VOC) sensors, particulate matter (PM) sensors, humidity sensors, and smoke detectors. For a given sample location (e.g., engine bay, wheel well, wheel bearing), a tube and any number of valves channel fluid samples from a tube inlet at the sample location towards the sensor housing at the confined location. Each sample location is sampled by connecting the tube to a pump using the set of valves. The pump may force air outwards (towards the tube inlet) to purge any potential debris in the tube or near the tube inlet. The pump may draw air inward through the sample tube (towards the housing), until air from the sample location fills the tube (dependent on the tube's length and the pump's capacity), and then delivering the air (as a fluid sample) to each sensor contemporaneously.

In an embodiment, a system comprising a sensor housing containing one or more sensors, the sensor housing situated at a confined location of a vehicle, the confined location environmentally partitioned from any sample location of the vehicle; a pump configured to force the one more fluid samples from the one or more sample locations to the sensor housing via a tube; a sensor of the one or more sensors of the sensor housing, the sensor configured to generate a sensor measurement for the fluid sample from the sample location; and a controller including a processor coupled to the one or more sensors, the controller configured to identify a vehicle status for the sample location of the vehicle based upon the sensor measurement received from the sensor.

In another embodiment, a method may comprise forcing, by a pump, one more fluid samples from one or more sample locations to a sensor housing via a tube, wherein the sensor housing contains one or more sensors, the sensor housing situated at a confined location of a vehicle, the confined location environmentally partitioned from any sample location of the vehicle; generating, by a sensor of the one or more sensors of the sensor housing, a sensor measurement for the fluid sample from the sample location; and identifying, by a controller including a processor coupled to the one or more sensors, a vehicle status for the sample location of the vehicle based upon the sensor measurement received from the sensor.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views. The accompanying drawings, which are incorporated in and constitute a part of this specification, illustrate various exemplary embodiments and together with the description, serve to explain the principles of the disclosed embodiments.

DETAILED DESCRIPTION

Figure 1A:
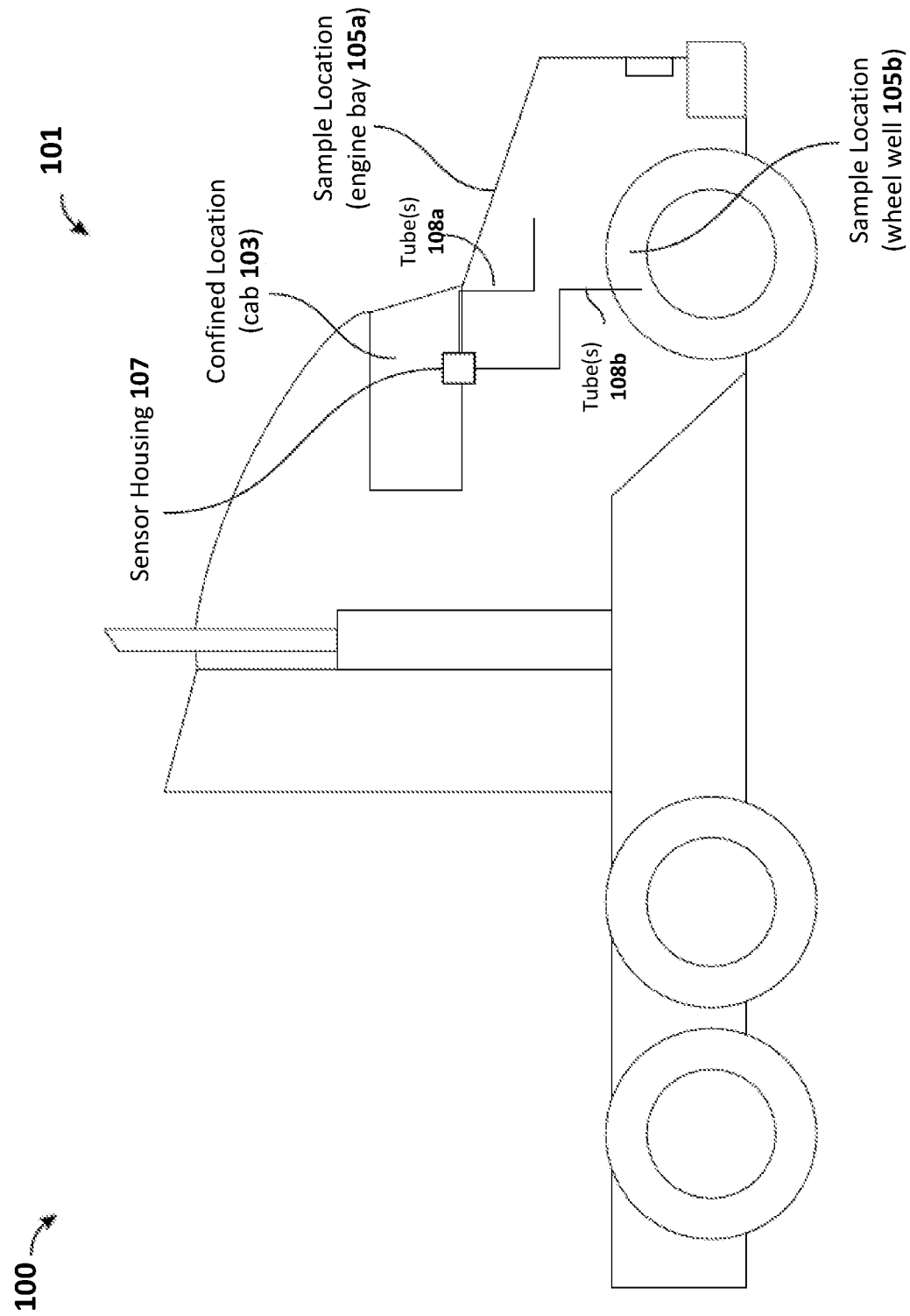
FIG. 1A shows of a vehicle including components of a gas sampling system comprising fluid transfer hardware, according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

FIGS. 1A-1D show components of a gas sampling system 101 implemented on a vehicle (shown as a truck 100). Certain locations around the truck include a cab 103 (or other confined location) and various exposed sample locations 105a-105b (generally referred to as "sample locations 105" or a "sample location 105"). The sampling system 101 comprises various fluid transfer hardware for transferring or channeling fluid (e.g., gases, air, liquids) to or from the particular locations 103, 105 of the truck 100, including any number of conduits or tubes 108a-108b (generally referred to as "tubes 108" or a "tube 108"), valves (not shown), and pumps 109a-109b (generally referred to as "pumps 109" or a "pump 109"). At the sample locations 105, tube inlets 111a-111b (generally referred to as "tube inlets 111" or a "tube inlet 111") allow the tubes 108 to collect fluid samples at the sample locations 105. The cab 103 contains any number of sensor housings 107 comprising any number of gas sensors 110a-110d (generally referred to as "gas sensors" or a "sensor 110") for analyzing the fluid samples.

Figure 1B:
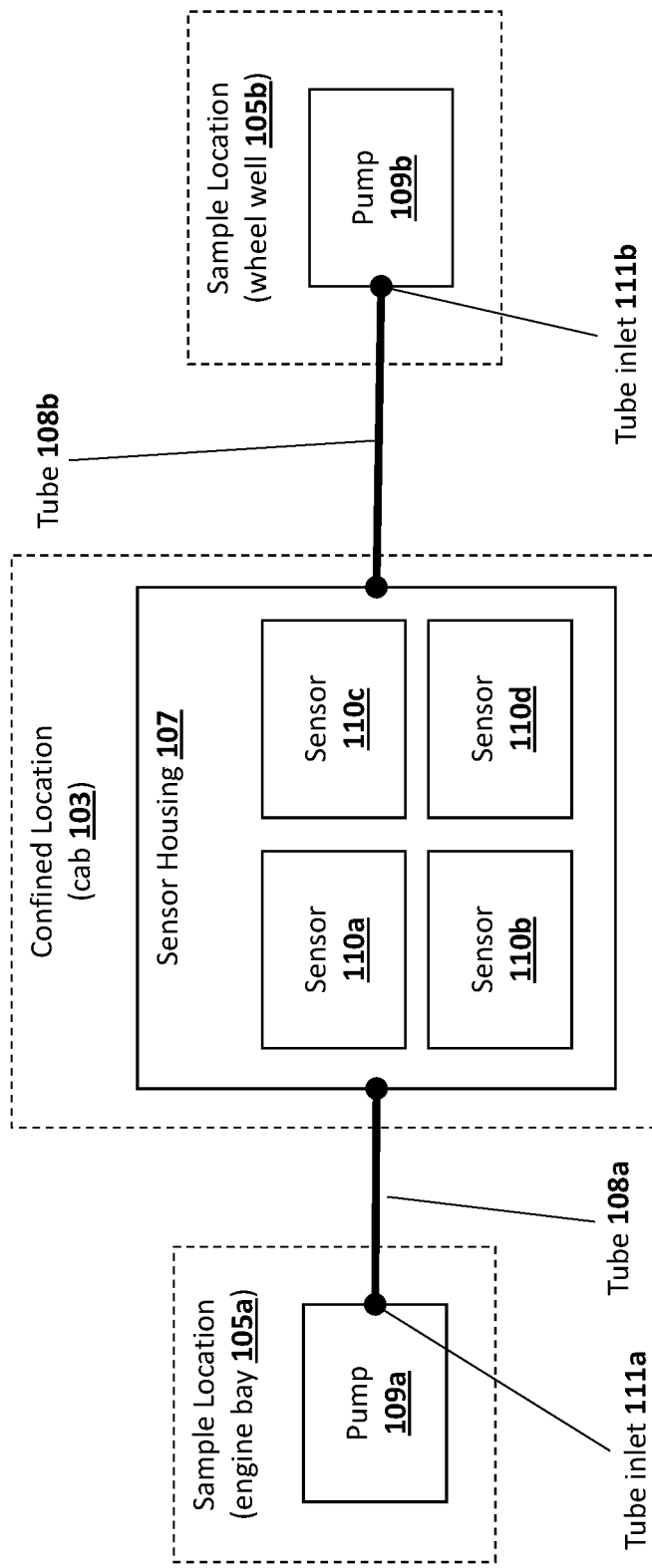
FIG. 1B is a block diagram showing components of the gas sampling system of the vehicle of FIG. 1A, according to an embodiment.
Figure 1C:
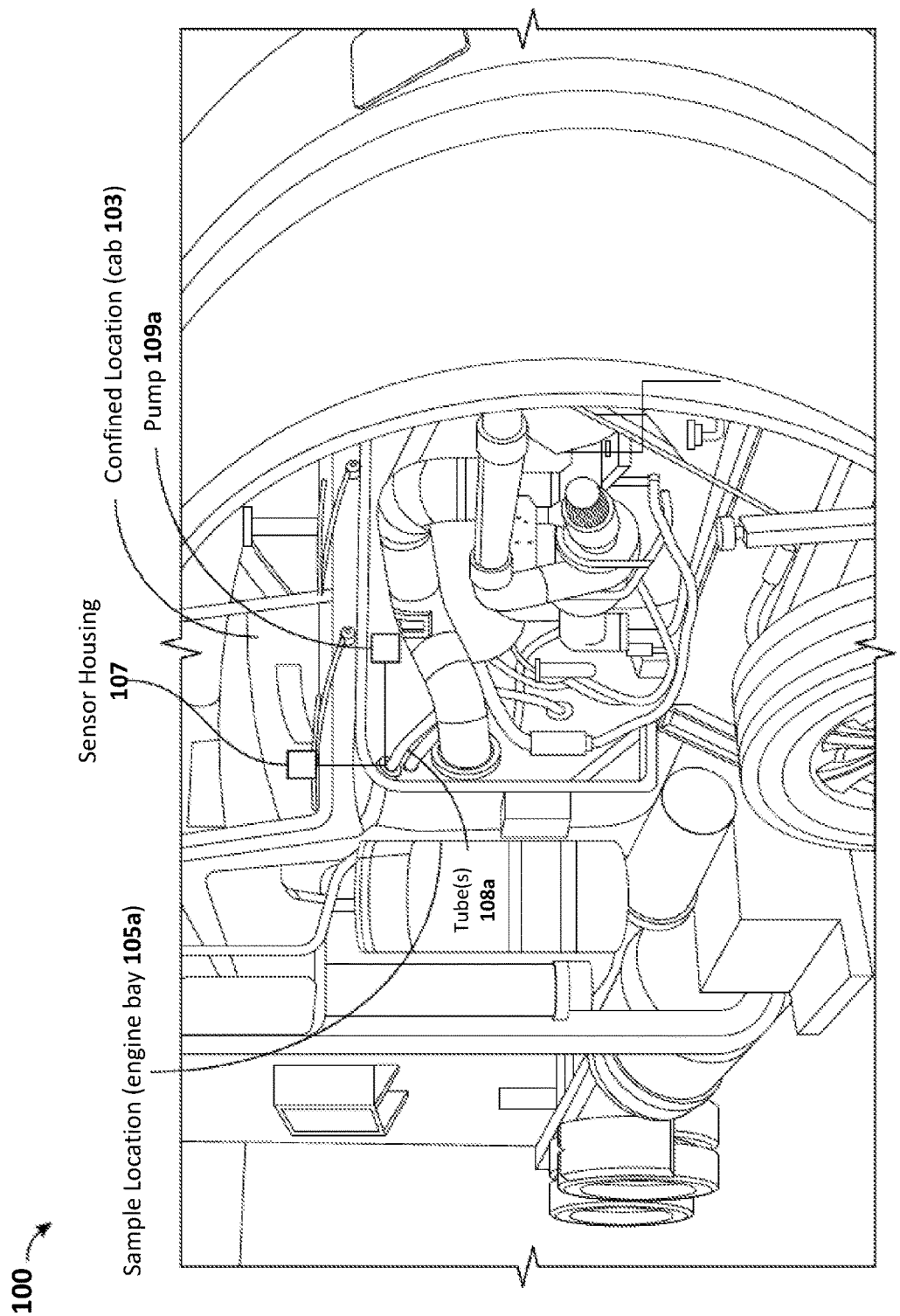
FIG. 1C shows certain components of the gas sampling system at an engine bay and cab of the vehicle of FIG. 1A, according to an embodiment.
Figure 1D:
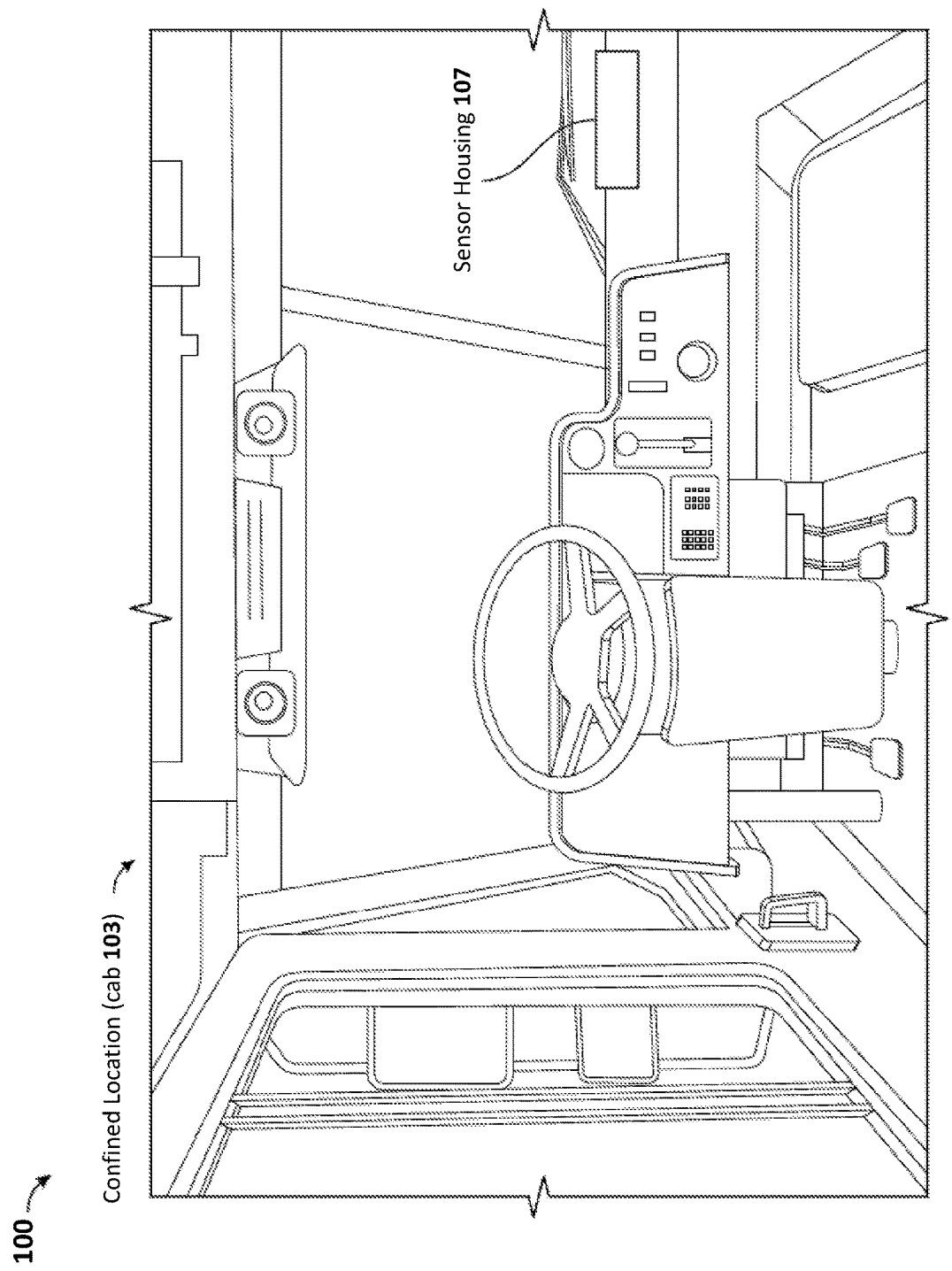
FIG. 1D shows an interior view of the cab of the vehicle of FIG. 1A, including a sensor housing of the gas sampling system, according to an embodiment.

Any confined location of the truck 100 includes any area of the truck 100 environmentally isolated and physically partitioned from the sample locations 105, where the confined location safely and securely stores the sensor housing 107. The sampling system 101 may include multiple sensor housings 107, and the truck 100 may likewise include any number of confined locations. As shown in FIG. 1D, the sensor housing 107 is affixed to the dashboard within the cab 103. This depiction is for ease of discussion and explanation. The sensor housing 107 could be situated anywhere within the cab 103 (e.g., glove box, beneath a seat, affixed to the ceiling) or anywhere within another confined location of the truck 100.

The sensor housing 107 comprises any sturdy material (e.g., metal, hard plastic) and any dimensions capable of housing the circuitry of the gas sensors 110. In some embodiments, the sensor housing 107 includes one or more controllers (not shown) for managing the functions of the gas sensors 110 and pumps 109. The controllers may further manage functions of the automated vehicle (truck 100), such as generating and executing navigational instructions or communicating with external computing systems (e.g., navigational systems, administrative systems). In some embodiments, the sensor housing 107 includes a communication interface (not shown) allowing the gas sensors 110 or controller to communicate sensor data (e.g., sensor measurements) or operating instructions with the external computing systems. The sensor housing 107 may include openings allowing sensor instrumentalities of gas sensors 110 to access the fluid samples arriving from the sample locations 105 via the tubes 108.

The sample locations 105 include areas around the truck 100 proximate to electrical or mechanical components of the truck 100, where monitoring fluid samples at the sample location 105 would indicate the health of the truck components (e.g., brakes, engine) situated at the sample locations 105. As shown in FIGS. 1A-1C, examples of the sample location 105 include the engine bay 105a and a wheel well 105b. With reference to FIG. 1C, a pump 109a is situated with one or more tubes 108a within the engine bay 105a of the truck 100, forming a channel between the sensor housing 107 (protectively situated in the cab 103) and the environment of the engine bay 105a. The pump 109a draws air or other fluid sample into the tube inlet 111a of the tube 108a to collect fluid samples of the engine bay 105a. The tube 108a channels the fluid sample to the gas sensors 110 in the sensor housing 107. In some cases, the pump 109a may purge air or debris from the tube 108a or tube inlet 111a by forcing air outward from the sensor housing 107, towards the engine bay 105a.

Similarly, as shown in FIGS. 1A-1B, a pump 109b is situated with one or more tubes 108b within the wheel well 105b of the truck 100, forming a channel between the sensor housing 107 (protectively situated in the cab 103) and the environment of the wheel well 105b. The pump 109b draws air or other fluid sample into the tube inlet 111b of the tube 108b to collect fluid samples of the wheel well 105b. The tube 108b channels the fluid sample to the gas sensors 110 in the sensor housing 107. In some cases, the pump 109b may purge air or debris from the tube 108b or tube inlet 111b by forcing air outward from the sensor housing 107, towards the wheel well 105b.

In some embodiments, the sample location 105 includes an area for collecting broader environmental information outside and beyond the truck 100. In this way, the gas sensors collect sensor measurements of the general environmental, used to, for example, normalize or calibrate the gas sensors according to broader environmental conditions or collect general environmental or climate data at particular geographic areas.

The sampling system 101 includes any number of pumps 109 capable of drawing fluid into the sampling system 101 or expelling fluid out of the sampling system 101. The example sampling system 101 comprises pumps 109 dedicated to each sample location 105. For instance, as shown in FIG. 1B, the sampling system 101 includes a pump 109a dedicated to the engine bay 105a and a pump 109b dedicated to the wheel well 105b. However, the sampling system 101 may comprise a single pump 109 or fewer pumps 109 than the number of sample locations 105. Moreover, as shown in FIG. 1C, the pump 109a is situated within the engine bay 105a. However, the pump(s) 109 of the sampling system 101 may be situated anywhere in the truck 100, and need not be situated at or proximate to the sample location(s) 105. As an example, in some embodiments a single pump 109 is situated at or proximate to the sensor housing 107 within the confined location and draws fluid through the tubes 108 of each sample location 105.

The tube 108 comprises any sturdy material and dimensions capable of effectively channeling fluid to and from the sensor housing 107.

The gas sensors 110 include hardware, software, firmware, or other components or sensor instrumentations capable of generating sensor measurements using the fluid samples gathered from the sample locations 105 of the truck. Non-limiting examples of the gas sensors 110 include VOC sensors, PM sensors, humidity sensors, carbon monoxide sensors, carbon dioxide sensors, NO2 sensors, fuel vapor detectors, thermometers, and smoke detectors, among others.

Figure 2:
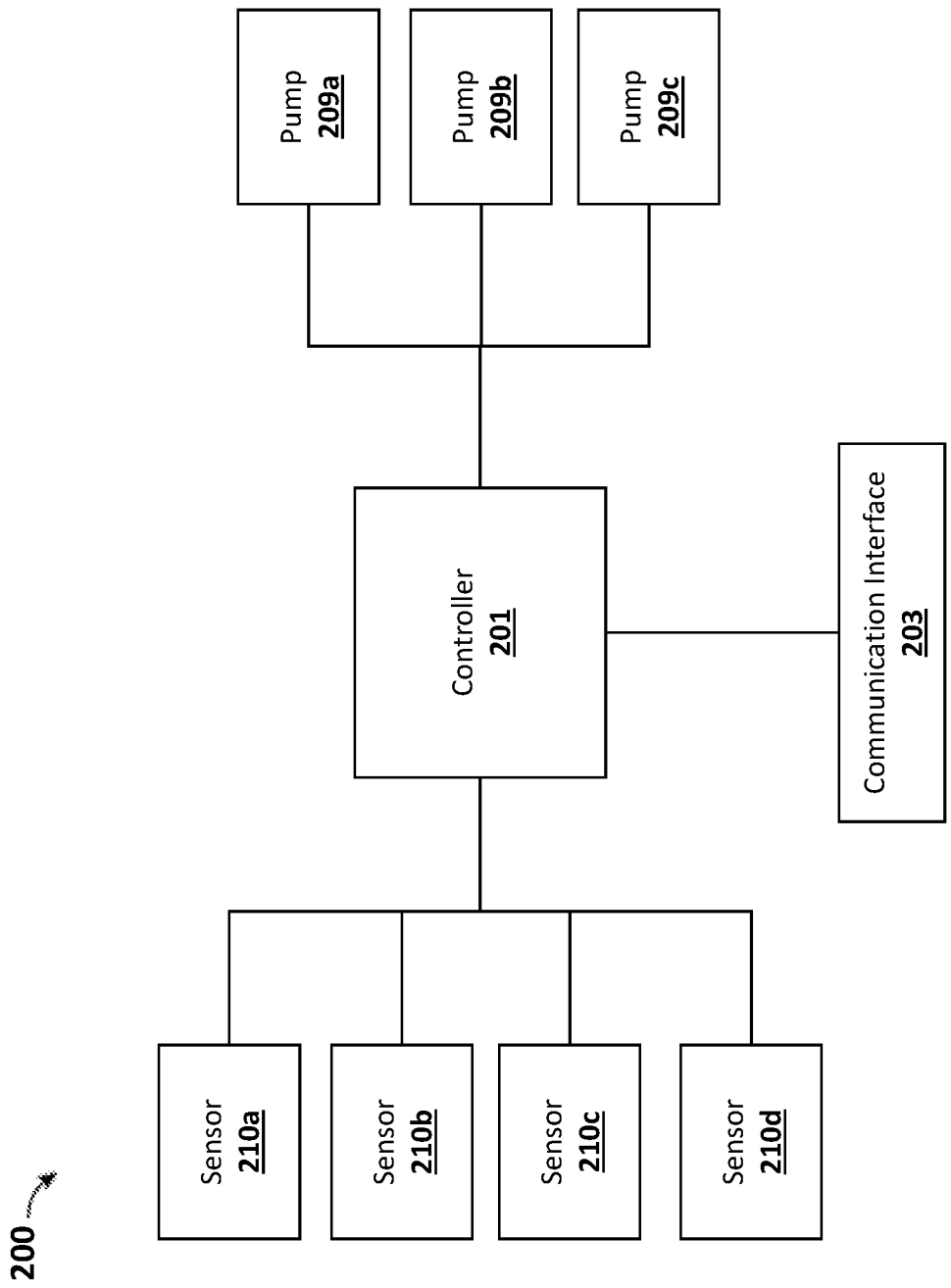
FIG. 2 shows components of a signaling system that manages operations of a sampling system and data communications for a vehicle, according to an embodiment.

FIG. 2 shows components of a signaling system 200 that manages operations of a sampling system and data communications. The signaling system 200 includes any number of sensors 210a-210d (generally referred to as "sensors 210" or a "sensor 210") situated in a sensor housing (not shown), any number of pumps 209a-209c (generally referred to as "pumps 209" or a "pump 209") situated in a confined location or sample location, one or more controllers 201, and one or more communication interfaces 203.

The controller 201 includes a processor or other controlling device comprising hardware and software components capable of executing various programmed machine-executable instructions, such as sending instructions for the sensors 210 or pumps 209 to perform certain functions or detecting certain triggering conditions in the signaling system 200 or sensor measurements, among others. The controller 201 communicates with the pumps 209, sensors 210, and communication interface 203 via any number electrical signaling channels (e.g., wires, cables).

The controller 201 manages the amount of air or other fluids in the sampling system by instructing the pumps 209 to draw air or purge air, at according to a given interval, according to certain triggering conditions, or in response to a user instruction. As an example, at vehicle startup or in response to an instruction to enter a maintenance mode, the controller 201 instructs the pump 209 to purge the air from tubes and tube inlets for a certain period of time. After the period of time or when the vehicle begins travelling, the controller 201 may then instruct the pump 209 to draw air from sample locations into the tubes for a given period of time or until the controller 201 otherwise determines that the air from the sample locations saturated the sampling system.

The controller 201 manages the operations and data generated by the sensors 210 by instructing the sensor 210 to, for example, begin generating sensor measurements, according to a given interval, according to certain triggering conditions, or in response to a user instruction. As an example, programming of the controller 201 determines that the air from the sample locations saturated the sampling system and, in response, instructs the sensor 210 to generate sensor measurements contemporaneously. In response, the sensors 210 take the air in the sampling system as a fluid sample and generate any number sensor measurements using the fluid sample.

The controller 201 may include a non-transitory memory for storing instructions or logging data (e.g., sensor measurements) reported from the sensors 210.

The controller 201 may receive instructions or report data to an external computing system via a communication interface 203, allowing the vehicle to, for example, wirelessly report logged sensor measurements, status information, navigation instructions, or other types of information. The controller 201 communicates the various types of information according to a given interval, according to certain triggering conditions, or in response to a user instruction. As an example, the controller 201 generates and transmits a fault notification to the external computing system, such as a computing device (not shown) of a remote operator or administrator, in response to the controller 201 (or a processor of a sensor 210) detecting a fault in the vehicle, as indicated by one or more sensor measurements.

The controller 201 or the sensor 210 includes fault detection programming for detecting faults in components of the vehicle based on sensor measurements. The fault detection programming compares a sensor measurement against a preprogrammed threshold that, when satisfied, indicates the instance of a particular fault. The fault detection programming may generate a signal or instruction for the controller 201 to perform one or more mitigation operations, such as reporting the fault or generating further sensor measurements to confirm the fault. As an example, if the sensor measurement indicates a fault at a particular sample location, then the controller 201 transmits an instruction to one or more sensors 210 to generate confirmation measurements using additional fluid samples captured from the particular sample location. In some cases, the programming of the controller 201 (or sensor 210) instructs the sensors 210 to capture comparatively larger fluid samples and/or generate comparatively more detailed sensor measurement information, which may reduce the potential for a false positive in fault detection.

In some embodiments, the controller 201 includes calibration programming for calibrating the sensors 210. The controller 201 may place the sensors 210 into a calibration setting, causing the controller 201 and sensors 210 to perform calibration operations. Additionally or alternatively, the controller 201 and sensors 210 may continuously perform calibration operations for calibrating the sensors 210. In some implementations, certain types of sensors 210 generate types of measurements that the controller 201 may use to calibrate or confirm other sensors 210. As an example, the signaling system 200 may include a VOC detector 210a, a humidity sensor 210b, a temperature sensor 210c, and a pressure sensor 210d. In this example, the controller 201 places the sensors 210 into a calibration setting and generates one or more calibration measurements that indicate the stable or normal environment conditions at a given sample location. Using the calibration measurements, the controller 201 and the VOC detector 210a may calibrate the sensor instrumentality of the VOC detector 210a relative to the calibration measurements.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
   a sensor housing containing one or more sensors, the sensor housing situated at a confined location of a vehicle, the confined location environmentally partitioned from any sample location of the vehicle;
   a pump configured to force one or more fluid samples from one or more sample locations to the sensor housing via a tube;
   a sensor of the one or more sensors of the sensor housing, the sensor configured to generate a sensor measurement for the one or more fluid samples from the one or more sample locations; and
   a controller including a processor coupled to the one or more sensors, the controller configured to identify a vehicle status for the one or more sample locations of the vehicle based upon the sensor measurement received from the sensor, wherein, in response to the controller determining that the sensor measurement indicates a fault, the controller is further configured to:
   obtain a second sensor measurement for a second fluid sample from the sensor; and
   determine whether the second sensor measurement indicates the fault in the vehicle status.

2. The system according to claim 1, wherein the controller is further configured to determine whether the sensor measurement indicates one or more faults in the vehicle status.

3. The system according to claim 1, wherein, in response to the controller determining that the sensor measurement indicates a fault, the controller is further configured to generate a notification for a remote operator associated with the vehicle.

4. The system according to claim 1, wherein the second fluid sample is comparatively larger than an earlier fluid sample.

5. The system according to claim 1, wherein the second sensor measurement includes comparatively more information than an earlier sensor measurement.

6. The system according to claim 1, wherein the sensor is configured to generate a calibration measurement for a calibration fluid sample received via the tube from the one or more sample locations, whereby the calibration measurement indicates a current environmental condition at the one or more sample locations; and
   wherein the controller is further configured to calibrate the sensor according to the calibration measurement relative to the current environment condition.

7. The system according to claim 1, wherein the pump is further configured to force cleansing air via the tube towards the one or more sample locations, thereby purging debris situated nearby an inlet of the tube.

8. The system according to claim 1, wherein the pump is further configured to force a fluid from the one or more sample locations to the sensor housing via the tube, until the fluid received from the one or more sample locations has filled the tube, and wherein the fluid is delivered to each sensor in the sensor housing contemporaneously as the one or more fluid samples.

9. The system according to claim 1, wherein the one or more sensors include at least one of a Volatile Organic Compound (VOC) sensor, a Particulate Matter (PM) sensor, a humidity sensor, a pressure sensor, a temperature sensor, a carbon monoxide sensor, a carbon dioxide sensor, an NO2 sensor, a fuel vapor detector, or a smoke detector.

10. The system according to claim 1, wherein the one or more fluid samples include a gaseous fluid or a liquid fluid.

11. A method comprising:
    forcing, by a pump, one or more fluid samples from one or more sample locations to a sensor housing via a tube, wherein the sensor housing contains one or more sensors, the sensor housing situated at a confined location of a vehicle, the confined location environmentally partitioned from any sample location of the vehicle;

generating, by a sensor of the one or more sensors of the sensor housing, a sensor measurement for the one or more fluid samples from the one or more sample locations; and identifying, by a controller including a processor coupled to the one or more sensors, a vehicle status for the one or more sample locations of the vehicle based upon the sensor measurements received from the sensor, wherein in response to the controller determining that the sensor measurement indicates a fault, the method further comprises:

obtaining a second sensor measurement for a second fluid sample from the sensor; and determining whether the second sensor measurement indicates the fault in the vehicle status.

12. The method according to claim 11, further comprising determining, by the controller, whether the sensor measurement indicates one or more faults in the vehicle status.

13. The method according to claim 11, wherein, in response to the controller determining that the sensor measurement indicates a fault, the controller generates a notification for a remote operator associated with the vehicle.

14. The method according to claim 11, wherein the second fluid sample is comparatively larger than an earlier fluid sample.

15. The method according to claim 11, wherein the second sensor measurement includes comparatively more information than an earlier sensor measurement.

16. The method according to claim 11, wherein the sensor generates a calibration measurement for a calibration fluid sample received via the tube from the one or more sample locations, whereby the calibration measurement indicates a current environmental condition at the one or more sample locations; and wherein the controller calibrates the sensor according to the calibration measurement relative to the current environment condition.

17. The method according to claim 11, wherein the pump forces cleansing air via the tube towards the one or more sample locations, thereby purging debris situated nearby an inlet of the tube.

* * * * *